(No Model.)

T. A. EDISON.
INCANDESCENT LAMP FILAMENT.

No. 454,262. Patented June 16, 1891.

UNITED STATES PATENT OFFICE.

THOMAS A. EDISON, OF LLEWELLYN PARK, NEW JERSEY.

INCANDESCENT-LAMP FILAMENT.

SPECIFICATION forming part of Letters Patent No. 454,262, dated June 16, 1891.

Application filed October 27, 1886. Serial No. 217,313. (No model.)

*To all whom it may concern:*

Be it known that I, THOMAS A. EDISON, of Llewellyn Park, in the county of Essex and State of New Jersey, have invented a certain new and useful Improvement in Incandescent Conductors for Electric Lamps, (Case No. 680,) of which the following is a specification.

The object of my invention is to obtain a carbon filament of vegetable material for the incandescent conductor of an electric lamp which shall be of even density throughout its body, and especially shall be free from pith-seams which occur in most vegetable substances. All the vegetable substances heretofore used for this purpose have been to a greater or less extent uneven in density.

I have found that the roots of many plants, and especially those of plants of the palm family, contain at their centers a very homogeneous portion, from which dense and even filaments can be prepared. The scrub-palmetto, which grows abundantly in Florida, is especially adapted for this purpose.

Figure 1:
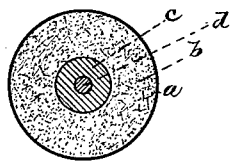
Figure 2:
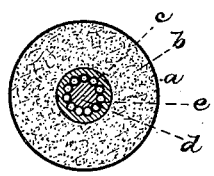
Figure 3:

Figures 1 and 2 of the drawings illustrate the structure of some of the forms of this root. Fig. 3 shows the center separated from one of them.

These roots consist of an outer shell $a$, a spongy portion $b$, a large central core $c$, and within this, in the form shown in Fig. 1, the hard portion $d$. In the form shown in Fig. 2 there are a number of very small holes $e$, very close together, surrounding the hard inside part. This inside part is removed by splitting the core $c$. The form shown in Fig. 2 gives a strip shaped as in Fig. 3. These inner strips or fibers thus obtained have no pithy seams, but are the aggregation of an immense number of fine parallel fibers held together with an unusual degree of tenacity. They are thus exceedingly suitable for the purpose mentioned.

The two forms shown are those which most frequently occur in the palmetto roots. Other forms sometimes occur, all having, however, one or more hard central collections of fibers. There is sometimes a small hole through the center of the mass, but this does not impair its usefulness.

The roots are preferably gathered while green, and are carefully dried before being split. The central body being removed in the manner stated, may be first dried, if necessary, and is then cut into the right lengths. These pieces are then split, shaved, cut, or otherwise formed into filaments of the desired size, which may be either flat or cylindrical, and usually with enlarged ends for clamping. The filaments are carbonized in the usual manner, and are then ready to be placed in the lamps.

What I claim is—

1. Carbon filaments for the incandescent conductors of electric lamps, formed from the hard central portions of the roots of plants, substantially as set forth.

2. Carbon filaments for the incandescent conductors of electric lamps, formed from the hard central portions of the roots of plants of the palm family, substantially as set forth.

3. Carbon filaments for the incandescent conductors of electric lamps, formed from the hard central portions of the roots of the scrub-palmetto, substantially as set forth.

This specification signed and witnessed this 26th day of October, 1886.

THOS. A. EDISON.

Witnesses:
WM. PELZER,
E. C. ROWLAND.